GEORG GRAF ARCO & RAGNAR HÅKAN RENDAHL.
MEANS FOR PRODUCING ELECTRICAL OSCILLATIONS.
APPLICATION FILED MAR. 18, 1909. RENEWED JAN. 8, 1917.

1,216,538.

Patented Feb. 20, 1917.
4 SHEETS—SHEET 1.

UNITED STATES PATENT OFFICE.

GEORG GRAF ARCO AND RAGNAR HÅKAN RENDAHL, OF BERLIN, GERMANY, ASSIGNORS TO GESELLSCHAFT FÜR DRAHTLOSE TELEGRAPHIE, M. B. H., OF BERLIN, GERMANY.

MEANS FOR PRODUCING ELECTRICAL OSCILLATIONS.

1,216,538.  Specification of Letters Patent.  Patented Feb. 20, 1917.

Application filed March 18, 1909, Serial No. 484,217. Renewed January 8, 1917. Serial No. 141,338.

*To all whom it may concern:*

Be it known that we, GEORG GRAF ARCO and RAGNAR HÅKAN RENDAHL, subjects of the German Emperor and the King of Sweden, respectively, and both residing at Berlin, Germany, have invented certain new and useful Improved Means for Producing Electrical Oscillations, of which the following is a specification.

Our invention relates to a method of producing rapid, and but very slightly damped electrical oscillations, particularly for use in radio-telegraphy, and a primary object is to provide improved means for carrying the same into practice.

The method consists in exciting an oscillatory circuit which contains no spark-gap, and consequently has only a small damping action, from another oscillatory circuit which contains a spark-gap of very small width, as, a rule less than 0.5 mm. in air for example between two adjoining terminal plates, and correspondingly more or less in other dielectrics, such as hydrogen for example. Such short gaps are called in the art "quenched" spark gaps, for the reason that the spark is quenched very rapidly therein.

It was found that such an arrangement had the advantage that, even when the circuits were coupled with one another fairly closely, the usual, relatively highly damped, coupling waves did not occur at all or only for a short time. On the contrary, practically only one wave was produced which corresponded to the fundamental oscillation and natural damping of the secondary circuit, so that after a short time the primary circuit, containing the spark-gap, could be looked upon as non-existing.

In spite of this advantage, however, this method could not be employed in practice heretofore, on the one hand because no energy worth mentioning could be converted, and, on the other hand, on account of the rapid destruction of the spark-gap terminals and the great inconstancy of the oscillations produced thereby.

Now in accordance with the present invention we do away with these defects in the first place by making the spark-gap of parallel plates or disks of good heat-conducting metal, having a coefficient of conduction of heat at least equal to that of gold, such as copper or silver, or alloys which contain these metals as their principal constituents. The electrodes may also be made of other suitable material, adapted for the mechanical requirements, having only the operative faces coated with copper or silver. The coatings must be as uniform and plane as possible, and it is preferable to apply them as sheet metal by rolling or soldering. Preferably, before the soldering operation, holes are drilled in the supporting plates or disks, through which the gases generated during the soldering operation can escape.

In order that our invention may be clearly understood reference will be made to the accompanying drawings in which several embodiments are represented diagrammatically by way of example, and in which:—

Figure 1 is an elevation partly in section of a spark-gap consisting of parallel plates or disks in a box, whereas

Figs. 3, 4, 5 and 6 are vertical sections of other modified forms of spark-gaps, whereas

Figs. 12 and 13 are, longitudinal and transverse sections respectively through a modified form of such a column provided with coolers, whereas

Fig. 15 is a sectional elevation of a spark-gap short-circuiting device, whereas

Figs. 20 and 21 are front sectional elevation and transverse section respectively showing parts of an improved alternating current generator, whereas

Figure 1:
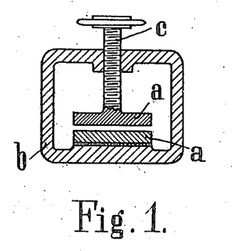
Figure 2:
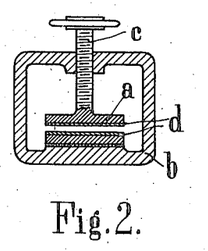
Fig. 2 is a like view of a spark-gap, whose plates or disks consist, for example, of brass provided with a coating of copper or silver.

Referring to the drawings and firstly particularly to Figs. 1 and 2, $a$ indicates the electrode plates, $b$ the box containing the same, $c$ a screw movable in the box and attached to the top plate, and $d$ the coating of copper or silver on the plates.

The constructional form according to Figs. 1 and 2 has the disadvantage that it is exceedingly difficult to keep the relatively large plates at a uniform, very small distance from one another to produce the short, quenched spark gap.

It has further been found that a considerably greater regularity of the sparks is obtained when all air is prevented access to the gap, apparently among other reasons because the electrodes then oxidize only comparatively slowly. Accordingly, an improved form of the invention is one in which the electrode plates are pressed against each other, and are kept at a definite distance apart by insulating intermediate layers, and in which the spark chamber is closed quite air-tight or as nearly so as possible.

Figure 3:
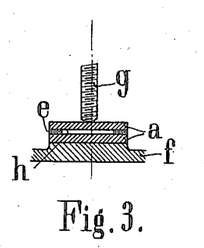

Fig. 3 represents by way of example one constructional form of such a spark-gap. In this figure $a$ indicates the electrodes, $e$ a ring of insulating material, for example mica or press-spahn which closes the spark chamber $h$ air-tight, $f$ denotes part of a box or clamp connected with the bottom electrode, $g$ the screw of the clamp which presses the top electrode toward the bottom. The ring $e$ serves simultaneously as a spacing insulator for keeping the electrode plates at a definite distance from one another, so that such distance is retained as uniform as possible over the entire surface.

The constructional form according to Fig. 3 has, however, still the disadvantage that the insulating material may be destroyed by the sparks, whereby injurious products of combustion remain in the spark chamber and the device is rendered inoperative after a few minutes.

This disadvantage is overcome by making the distance between the electrodes greater at the edges of the insulating material than in the spark chamber, whereby the insulating material is protected from being burnt. Constructional forms of such an arrangement are represented for example in Figs. 4 and 5.

Figure 4:
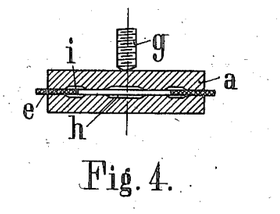
Figure 5:
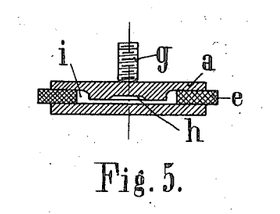

In Fig. 4 $a$ indicates the electrodes, $e$ the spacing insulating ring, $i$ grooves in the electrodes. In Fig. 5 like reference characters denote similar parts to those in Fig. 4, but the groove $i$ is formed by suitably shaping one electrode $a$, as clearly shown.

Figure 6:
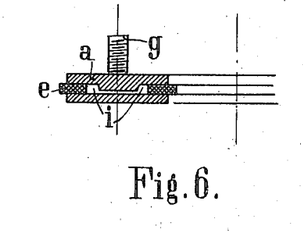

In all constructional forms it is essential that all sharp edges be avoided. Further, it is very important to increase somewhat the distance between the electrodes in the central part of the gap, so that the spark chamber becomes annular. In contradistinction to the increase in distance between the electrodes at the edges of the insulation, this increase in the center does not require to be very considerable and may be made, for example, by grinding with emery. In the case of very large spark-gaps it is preferable not to shape the electrodes as disks but as rings, as clearly shown in Fig. 6.

A simple spark-gap as described above with reference to Figs. 4 to 6 permits of the production of a considerable oscillatory energy with certainty of working. This, however, soon reaches a limit which is occasioned by electrical and practical reasons, so that as a rule a transmitter operating together with the spark-gap would scarcely exceed a range of 50 to 100 kilometers, which, as is well known, would not suffice in practice for radio-telegraphy.

In order to increase the energy converted into oscillations beyond these limits, according to additional embodiments of the present invention a plurality of spark-gaps of the character described above are connected in series.

Figure 7:
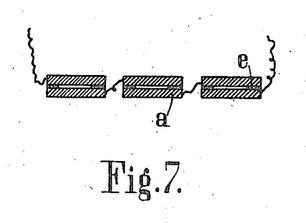
Fig. 7 is a like view of a series spark-gap.
Figure 8:
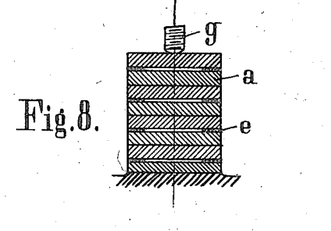
Figs. 8 and 9 are like views of improved series spark-gaps in the forms of columns, the inclosing box being entirely omitted or only partially shown in Figs. 3 to 9 inclusive.

Fig. 7 shows such a connection in which three spark-gaps of the form shown in Fig. 3 are shown connected in series. Fig. 8 shows another constructional form in which the electrode disks $a$ are superposed and pressed together by means of one single screw $g$, whereby a considerable saving in space and simplicity in working is obtained when a large number of partial sparking distances are employed. Preferably the electrode disks $a$ are of equal size and the rings $e$ equally thick, so that a uniform distribution of the entire tension is obtained among the individual sparking distances.

Figure 9:
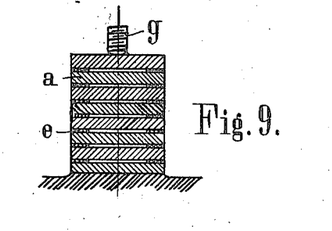

Fig. 9 shows a further improvement which consists in the two sides of all the disks $a$, with the exception of the two outermost, being utilized as operative electrodes.

Whereas in simple spark-gaps the heat produced by the sparks can sufficiently flow away directly, this is not the case with the inner plates of a series spark-gap and therefore they become unduly heated. To avoid this, according to the invention coolers are employed which are either arranged between the electrodes or, in somewhat small constructional forms, are connected as cooling ribs with the electrodes.

Figure 10:
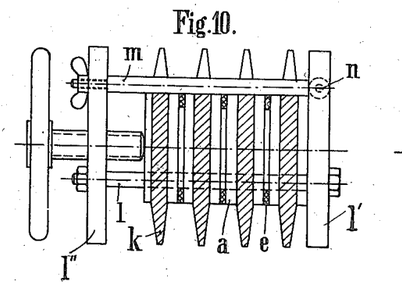
Figs. 10 and 11 are longitudinal elevation partly in section and transverse section respectively of a series spark-gap column provided with coolers.
Figure 11:
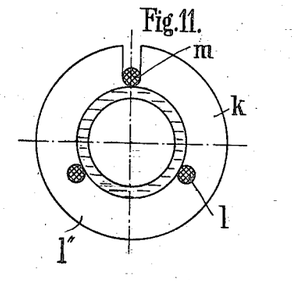

Three constructional forms of such an arrangement are illustrated by way of example in Figs. 10 to 14. Referring firstly to Figs. 10 and 11, coolers $k$ are arranged between the outer faces of the electrodes $a$. In this form these coolers are made as solid disks of good heat-conducting material which take up the heat of the electrodes by conduction and radiate it into the air. For the latter purpose they possess a larger diameter than the electrodes $a$ so that the entire aggregate has the appearance of a radiator well-known in the art of heating.

Figure 12:
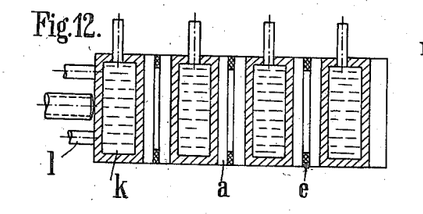
Figure 13:
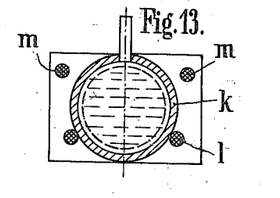

In the constructional form according to Figs. 12 and 13 the coolers $k$ are made hollow for holding a cooling liquid, such as water for example. For this reason they do not need to project beyond the edge of the electrodes, since the heat is withdrawn from the cooling liquid by circulation or, as indicated in the example illustrated, by evaporation. It is to be understood that the device may also be cooled by a gaseous agent instead of by liquid means.

The construction of the columns comprising electrodes, spacing insulating rings and coolers is so arranged according to the present invention that it is readily possible to exchange individual elements, their correct positions relatively to the other elements being simultaneously assured. For this purpose, in the constructional form shown in Figs. 10 and 11 the electrodes $a$, and in the constructional form shown in Figs. 12 and 13 both the electrodes $a$ and the coolers $k$ rest on two insulated rods $l$ which extend the entire lengths of the columns; in the former example these rods pass through corresponding holes in the coolers, and are attached to the end plates $l'$ and $l''$, and together with these constitute the frame of the spark-gap. By means of the clamping screw $g$ movable in the top plate the disks, spacing rings and coolers can be pressed together and held in position between the screw and the bottom plate.

In order to make it still more certain that the spark-gap will be assembled correctly, in the form shown in Figs. 10 and 11 there is arranged above the electrodes $a$ a third rod $m$ which, when electrodes are to be exchanged, can be turned up around a pivot $n$ provided in the bottom plate. For this purpose, instead of a hole a slit is provided in the coolers $k$ for this rod, as clearly shown in Fig. 11. In the form shown in Fig. 12, there may be provided above the electrodes two rods $m$ placed so far from one another that the elements between them can be lifted out.

Figure 14:
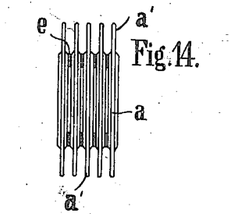
Fig. 14 is an elevation of part of a series spark-gap column provided with cooling ribs.

In the form shown in Fig. 14 each of the electrodes is provided with a cooling rib $a'$ as clearly shown.

In another modification according to the invention the series spark-gaps just described above are provided with a short-circuiting device by means of which one or more partial sparking distances can be short-circuited at will. For example, if it is desired to work alternately with coherer or detectors for instance those of the electrolytical or rectifying type, this is possible according to the present invention by using, for working with the coherer, all the sparking distances and thereby obtaining a few discharges of high potential, whereas for working with a detector a part is short-circuited and thereby frequent discharges are obtained with the same charging voltage.

Figure 15:
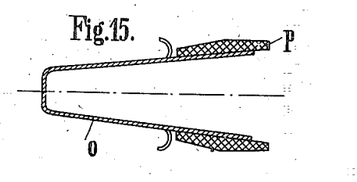
Figure 23:
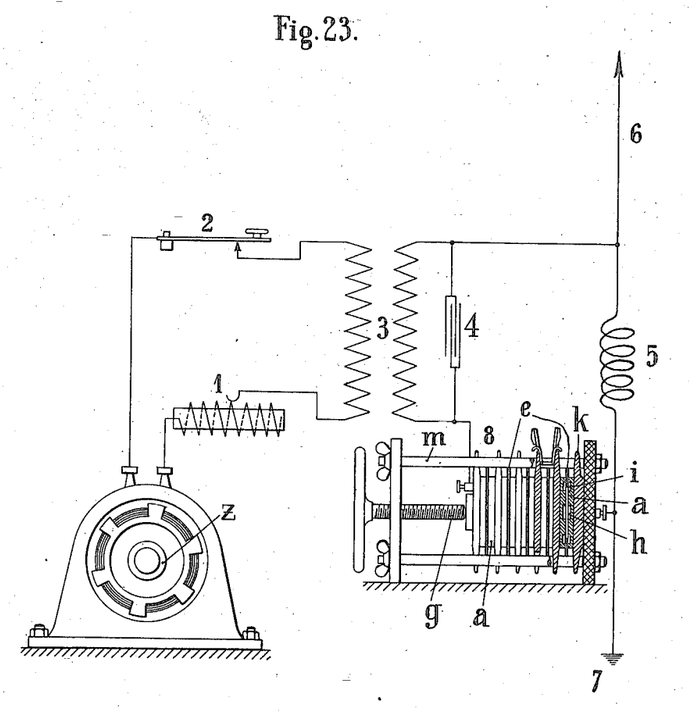

Such a device is represented by way of example in Fig. 15, in which $o$ indicates the clamping clip, and $p$ the insulating handle. In Fig. 23 part of the series spark-gap is shown short-circuited by such a device.

Figure 16:
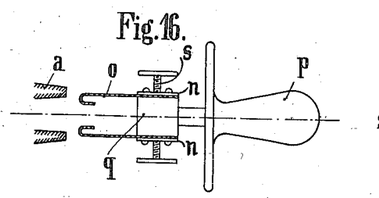
Figs. 16 and 17 are side and end elevation respectively of another form of spark-gap short-circuiting device according to the invention.
Figure 17:
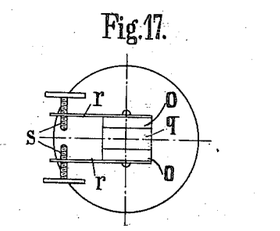

Another constructional form of short-circuiting device which is particularly suitable for testing purposes is represented by way of example in Figs. 16 and 17. In these figures $q$ denotes a block of insulating material having an insulating handle $p$. On the block are mounted two metal strips $r$ which extend transversely to the block as shown in Fig. 17, and into which are screwed micrometer screws $s$ with their points facing one another so that the distance between the points can be varied and measured. With the metallic strips $r$ there are electrically connected elastic contact clips or hooks $o$, insulated from each other by block $q$, which are shaped and arranged in such manner that they can be thrust between the electrodes $a$, the gap between which is to be tested. The spark-gap is then formed between these points from a certain distance between the points of the screws onward, so that from the distance between the points at which the spark first occurs the length of the spark-gap between the tested electrodes $a$ can be concluded.

Now the series spark-gaps hereinbefore described with reference to Figs. 7 to 14 admit of a much greater energy of oscillation being emitted than a simple spark-gap according to the forms shown in Figs. 1 to 6. But here also a limit is soon reached owing to the practically admissible tension at the transmitter. Since, as is known, the energy converted into oscillations per second is expressed by the formula $$\frac{nCV^2}{2},$$

in which
  $n=$ number of discharges
  $C=$ capacity of the oscillatory circuit, and
  $V=$ tension at which the condenser is charged,
and, since, on the other hand, $C$ is determinative for the length of the waves which are to be emitted, and accordingly can be increased only within narrow limits, it would have seemed quite obvious, in order to obtain a large $n$, i. e. in order to obtain as great a discharge as possible, to employ a direct current for feeding the arrangement. We have however found that direct current feeding has considerable disadvantages. After a short time the spark tends to occur at all times at the same portion of the electrodes, which are thus rapidly destroyed whereby the entire arrangement is soon made inoperative. Also the time interval between the sparks is by no means regular.

A further object of the invention is to remove these defects, by supplying the spark gaps described before with alternating current. The alternating current may be supplied in this instance by an alternating current generator, the current of which is either directly or indirectly, by means of a transformer, conducted to the spark gaps, or also it may be supplied through the secondary coil of a transformer, the primary coil of which is supplied with pulsating direct current. The explanation of the advantageous behavior of the spark-gap with alternating current feeding may be found in the fact that the spark is continuously compelled to use new places for jumping across. In practice, indeed, the electrodes look quite different according as they are fed with direct or alternating current. In the former case almost the entire face is intact and only at the edge of the spark chamber is a considerably changed place found. In the second case the entire plate is seen to be uniform at all places, and even after working for days looks exceedingly little changed apart from possible oxidation.

The manner in which these spark gaps may be supplied by alternating current will now be described to complete the disclosure, though this subject matter has been described and claimed in my co-pending application Ser. No. 652,018, which is divided from the present application.

If a telephone and an integrating detector are employed at the receiving station, according to the working conditions of the transmitter in each case there are the following possibilities:—

*Case 1.*—The feeding arrangement is so tuned in known manner that only one spark for several alternations is produced for instance by reducing the charging voltage. The tone which is perceived does not differ from that which has been perceived with the spark-gap used heretofore.

*Case 2.*—The apparatuses are so adjusted that exactly one spark is produced for each alternation. The tone which is perceived now corresponds to the periodicity of the machine.

*Case 3.*—The apparatuses are so adjusted that several, but still few, sparks per alternation are produced. As in case 2, the tone of the feeding machine is perceived. It is, however, accompanied by extraneous noises which proceed from the irregular sequence of the sparks during each period.

*Case 4.*—An exceedingly large number of sparks are produced per alternation. Here again, as in case 2, the tone of the feeding machine is perceived. But the extraneous noises are less noticeable than in case 3.

It is seen from the above that the possibility exists of perceiving at the receiving station the tone of the feeding machine instead of the noises perceived heretofore which are very similar to those due to atmospheric disturbances. Now a further feature of our invention consists in so selecting the frequency of the feeding machine that in the receiver at the receiving station the tones having about 400 to 3000 vibrations per second are produced which are easiest perceptible by the human ear.

In the case of long spark-gaps known heretofore the employment of alternating current of such high frequency would have been disadvantageous, indeed impossible, as the spark would have soon become inactive. This could only be avoided by employing a blast magnet, an air blast or rotating electrodes. These, however, still further reduce considerably the already very low efficiency, *i. e.* the ratio between the primary energy of the machine and the energy which is to be emitted, which amounts to at most 20%, whereas an efficiency up to 70% can readily be obtained by the means according to the present invention.

By producing a musical tone in the receiver the important advantage of practically complete freedom from disturbance in working wireless stations is obtained, both with regard to other stations and also with regard to atmospheric discharges. The tone in the telephone at the receiving station is easily perceived by the ear even when of very weak intensity, and contrasts distinctly with the noises produced by disturbances, in like manner, for example, as the sounds of human speech contrast with microphone extraneous noises in telephony. In this manner several wireless stations, which are tuned to the same high frequency, can be worked independently and free from disturbance by one another by means of transmitters which are tuned to different acoustic pitches. The capability of selection afforded hereby can also be carried still further by means of telephone diaphragms tuned to a definite pitch, by means of other monotonic acoustic resonators, or by means of oscillating systems tuned to definite periods, and the like, electrical and acoustic tuning being able to be combined simultaneously.

If it is wished to produce a musical tone and simultaneously emit large quantities of energy certain difficulties are met with. The above mentioned best method of producing a tone (case 2, one spark per alternation) admits of the energy being increased to only a certain limit, from which point onward inadmissible tensions would occur. The number of sparks per alternation can indeed be increased considerably (case 4), but with the disadvantage that the loudness of the sound at the receiving station would be in no relation to the increase of energy at the transmitting station.

Figure 18:
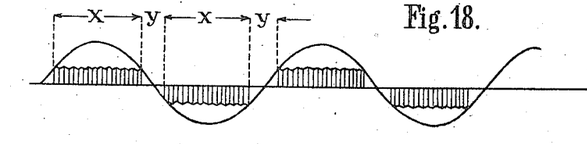
Figs. 18 and 19 are diagrams of current curves clearly explained hereinafter.

Fig. 18 shows the distribution of the sparks for this case. The sparks are indicated by the alternately upwardly and downwardly directed vertical lines. It is seen that the sparkless pauses $y$ between two discharging periods $x$ are only short. On account of these short sparkless pauses, from a certain periodicity of the feeding current onward the telephone diaphragm has no time to vibrate back into its normal position. The consequence of this is that the maximum amplitudes of the vibrating diaphragm do not become so great as might be expected of them with a given energy and that, in addition, scarcely audible and impure tones are produced.

A further object of our invention therefore is to provide that the current curve shall run in a form deviating from the usual sine curve in such manner that the sparkless pauses between the times of discharge are at least as great as the times of discharge.

Figure 19:
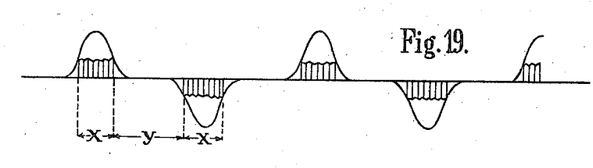

Such a curve is represented in Fig. 19, wherein $x$ again indicates the time with sparks and $y$ that without sparks. The time $y$ which is equal to $2x$ allows the diaphragm which is brought by the sparks during the time $x$ out of its normal position to vibrate back into its initial position, so that the subsequent sparks can act afresh on it.

Figure 20:
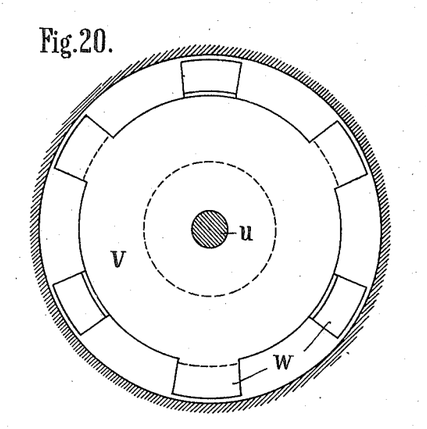
Figure 21:
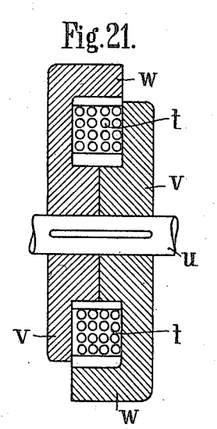

A generator particularly suitable for use in carrying into practice the present invention is illustrated by way of example in Figs. 20 and 21. The former figure shows a claw-field generator in front sectional elevation and the latter is a transverse section of the rotor only. V indicates the stator. The rotor $v$ has only one single winding $t$, which is arranged within two halves $v'$, $v^2$ of the rotor keyed on the shaft $u$, and, further, at its periphery a series of claw-like poles $w$ overlapping the winding and situated alternately on the one and the other half of the rotor. This arrangement, which is known in itself, has the advantage of a specially favorable construction and admits of a very high speed being obtained. In the construction used heretofore the distance between the individual claws was approximately equal corresponding to the desired sine curve. The stray field between the individual claws was therefore very great so that the efficiency of the machine was thereby very much impaired and the above mentioned advantages were canceled.

According to our present invention the rotor is so constructed that the distance between the claws $w$ corresponding to the form of curve according to Fig. 19 is at least twice as great as the breadth of the claws. The stray field losses are thereby reduced to a fraction of the previous amount, without the advantages of the present construction being diminished. Where difficulty is encountered in obtaining a single phase alternator of the desired high frequencies above referred to, a multiphase alternating current generator of the ordinary commercial frequencies may be used. When three-phase current is employed for example, a periodicity three times as high can be produced and, accordingly, with a given pitch of the note of the receiver, a periodicity of the generator one third as high suffices.

Figure 22:
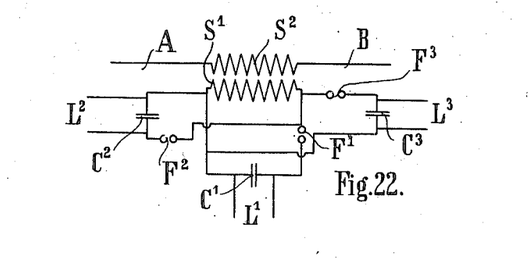
Figs. 22 and 23 are diagrams of connections of radiotelegraphic systems fed by alternating current generators in accordance with the invention, the series spark-gap in the diagram 23 being shown in vertical section.

This feature of the invention is illustrated diagrammatically in Fig. 22. Here $L^1$, $L^2$, $L^3$ are the leads for the three phases of the alternating current. In the lead $L^1$ is inserted the first oscillatory circuit consisting of the condenser $C^1$ and the spark-gap $F^1$ and likewise in the leads $L^2$ and $L^3$ are connected the second and third oscillatory circuits provided with the condensers $C^2$ and $C^3$ and the spark-gaps $F^2$ and $F^3$ respectively. By means of the coils $S^1$ and $S^2$ the oscillations of the three primary circuits are transmitted to the secondary system which consists, for example, of the antenna A and the earth connection B.

The primary system consisting of the three oscillatory circuits receives during one period of the generator three impulses, so that a periodicity three times as high is generated in the secondary circuit.

Further, this arrangement has the advantage that the individual spark-gaps are loaded less than when a single-phase generator having a periodicity three times as high is employed. Moreover an actual musical tone is produced in the receiver if care is taken that the above described conditions are fulfilled under which the oscillations are produced in the desired frequency equal to the pitch of the tone desired. On the other hand it is possible, by increasing the number of sparks per phase, to obtain a practically noiseless transmitter, just as if direct current were employed, but with the difference that, with regard to the constancy of the oscillations and the quantities of energy, it has all the advantages of the alternating current.

Referring now to Fig. 23, the entire arrangement of a system for radiotelegraphy is here represented, the previously described means being employed therein. In this figure $z$ denotes a claw-field generator of high periodicity which gives a current curve corresponding to that shown in Fig. 19; 1 denotes a variable inductive resistance, 2 a Morse key and 3 a transformer. The circuit comprising these parts 2, 1, 2 and 3 serves for feeding the high frequency system. In this latter system 4 denotes a condenser, which forms with the self-induction coil 5 and the spark-gap 8 a closed oscillation circuit, with which the antenna circuit is associated. The remaining details of the general arrangement have already been described above.

While we are aware that with respect to the features of our new spark gap, certain individual features or elements thereof may be known in the art, we claim that the merit of our invention resides principally in the discovery that certain groups of metals, characterized by their heat conductivity, as active electrodes of the so-called quenched gaps employed in the shock excitation method, as well as the shape of the electrodes and their manner of assembling as set forth more particularly in the annexed claims, have rendered this method of producing powerful oscillations commercially practicable, whereas heretofore while this method was known in the art, it was impracticable for such commercial use for the reasons stated hereinbefore.

We claim:—

1. In an arrangement for producing slightly damped electrical oscillations by the shock excitation method, a short, quenched spark gap, comprising a plurality of electrodes, the active faces of said electrodes being composed of a good heat conducting metal, having a co-efficient of heat conduction at least equal to that of gold.

2. In an arrangement for producing slightly damped electrical oscillations by the shock excitation method, a short, quenched spark gap, comprising a plurality of parallel electrodes, the active faces of said electrodes being composed of a good heat conducting metal, having a coefficient of heat conduction at least equal to that of gold.

3. In an arrangement for producing slightly damped electrical oscillations by the shock excitation method, a short, quenched spark gap, comprising a plurality of plates forming the electrodes of the gap, the active faces of said plates being composed of a good heat conducting metal, having a co-efficient of heat conduction at least equal to that of gold.

4. In an arrangement for producing slightly damped electrical oscillations by the shock excitation method, a short, quenched spark gap, comprising a plurality of electrodes, the active faces of said electrodes being composed of silver.

5. In an arrangement for producing slightly damped electrical oscillations by the shock excitation method, a short, quenched spark gap, comprising a plurality of parallel electrodes, the active faces of said electrodes being composed of silver.

6. In an arrangement for producing slightly damped electrical oscillations by the shock excitation method, a short, quenched spark gap, comprising a plurality of plates forming the electrodes of the gap, the active faces of said electrodes being composed of silver.

7. In an arrangement for producing slightly damped electrical oscillations by the shock excitation method a short, quenched spark gap, comprising a plurality of electrodes, the active faces of said electrodes being composed of good heat conducting metal, having a co-efficient of heat conduction at least equal to that of gold, and means for hermetically sealing the sparking area of said electrodes.

8. In an arrangement for producing slightly damped electrical oscillations by the shock excitation method, a short, quenched spark gap, comprising a plurality of plates forming the electrodes of the gap, the active faces of said plates being composed of a good heat conducting metal, having a coefficient of heat conduction, at least equal to that of gold, and means for hermetically sealing the sparking area of said electrodes.

9. In an arrangement for producing slightly damped electrical oscillations by the shock excitation method a short, quenched spark gap, comprising a plurality of parallel electrodes, the active faces of said electrodes being composed of a good heat conducting metal, having a coefficient of heat conduction at least equal to that of gold, and means for hermetically sealing the sparking area of said electrodes.

10. In an arrangement for producing slightly damped electrical oscillations by the shock excitation method, a short, quenched spark gap, comprising a plurality of parallel plates forming the electrodes of the gap, the active faces of said plates being composed of a metal having a coefficient of conduction of heat at least equal to that of gold, a spacing insulator arranged between said plates for determining the width of the gap between the same, and clamping means for holding said plates and insulator together.

11. In an arrangement for producing slightly damped electrical oscillations by the shock excitation method, a short, quenched spark gap, comprising a plurality of parallel plates forming the electrodes of the gap, the active faces of said plates being composed of a metal having a coefficient of conduction of heat at least equal to that of gold, a spacing insulator of uniform thickness arranged between said plates for determining the width of the gap between the same, and clamping means for firmly holding said plates and insulator together under pressure, whereby an air-tight spark chamber is obtained.

12. In an arrangement for producing slightly damped electrical oscillations by the shock excitation method, a short, quenched spark gap, comprising a plurality of parallel plates forming the electrodes of the gap, the active faces of said plates being composed of a metal having a coefficient of conduction of heat at least equal to that of gold, a spacing insulator arranged between said plates for determining the width of the gap between the same, and clamping means for holding said plates and insulator together, the distance between said plates at the edges of the insulator being greater than the width of the gap which it determines.

13. In an arrangement for producing slightly damped electrical oscillations by the shock excitation method, a short, quenched spark gap, comprising a plurality of parallel plates forming the electrodes of the gap, the active faces of said plates being composed of a metal having a coefficient of conduction of heat at least equal to that of gold, and means for holding said plates at a definite distance apart, the shape of the active faces of said plates being such that the sparking space between the same is annular.

14. In an arrangement for producing slightly damped electrical oscillations by the shock excitation method, a series of quench spark gaps, comprising a plurality of gap electrodes having their active faces composed of a metal having a coefficient of heat conduction at least equal to that of gold.

15. In an arrangement for producing slightly damped electrical oscillations by the shock excitation method, a series of quench spark gaps, comprising a plurality of electrodes having their active faces parallel to each other and being composed of a metal with a coefficient of heat conduction at least equal to that of gold, said electrodes forming the electrodes of the spark gap units of which the series gap is composed.

16. In an arrangement for producing slightly damped electrical oscillations by the shock excitation method, a series of quench spark gaps, comprising a plurality of electrodes having their active faces composed of silver, said electrodes forming the electrodes of the spark gap units of which the series gap is composed.

17. In an arrangement for producing slightly damped electrical oscillations by the shock excitation method, a series of quench spark gaps, comprising a plurality of parallel disks of a metal, having a coefficient of conduction of heat at least equal to that of gold, forming the electrodes of the spark gap units of which the series gap is composed, insulating spacing rings arranged one between each adjacent pair of disks for determining the width of each gap unit and clamping means for holding said disks and said rings together.

18. In an arrangement for producing slightly damped electrical oscillations by the shock excitation method, a series of quench spark gaps, comprising a plurality of parallel disks of a metal, having a coefficient of heat conductivity at least equal to that of gold, forming the electrodes of spark gap units of which the series gap is composed, insulating spacing rings arranged one between each adjacent pair of disks for determining the width of each gap unit and clamping means for holding said disks and said rings air-tight together.

19. In an arrangement for producing slightly damped electrical oscillations by the shock excitation method, a series of quench spark gaps, comprising a plurality of parallel disks of a metal, having a coefficient of heat conductivity at least equal to that of gold, forming the electrodes of spark gap units, of which the series gap is composed, insulating spacing rings arranged one between each adjacent pair of disks for determining the width of each gap unit, and clamping means for holding said disks and said insulators together, the distance between the electrodes at the edges of the insulators being greater than the width of the gap space.

20. In an arrangement for producing slightly damped electrical oscillations by the shock excitation method, a series of quench spark gaps, comprising a plurality of parallel disks of a metal having a coefficient of conduction of heat at least equal to that of gold, forming the electrodes of which the series gap is composed, a cooling rib connected with each disk, insulating spacing rings arranged one between each adjacent pair of disks for determining the width of each of said units, and clamping means for holding said disks and said rings together.

21. In an arrangement for producing slightly damped electrical oscillations by the shock excitation method, a series of quench spark gaps, comprising a plurality of parallel disks of a metal having a coefficient of conduction of heat at least equal to that of gold, forming the electrodes of spark gap units of which the series gap is composed, a cooling disk-shaped plate composed of a good heat conducting metal contacting with, and extending beyond the periphery of each disk, insulating spacing rings arranged one between each adjacent pair of disks for determining the width of each of said units and clamping means for holding said disks and said rings together.

22. In an arrangement for producing slightly damped electrical oscillations by the shock excitation method, a series of short quench spark gaps, comprising a plurality of parallel disks of a metal having a coefficient of conduction of heat at least equal to that of gold, forming the electrodes of spark gap units of which the series gap is composed, insulating spacing rings arranged one between each adjacent pair of disks for determining the width of each of said units, and clamping means comprising a base plate, a top plate, a plurality of insulated rods, carrying said electrodes, attached to said plates, and a screw movable in said top plate for clamping said disks and rings together and against the bottom plate, as set forth.

23. In an arrangement for producing slightly damped electrical oscillations by the shock excitation method, a series of quench spark gaps, comprising a plurality of parallel disks of metal, having a coefficient of conduction of heat at least equal to that of gold, forming the electrodes of spark gap units of which the series gap is composed, a cooler connected with each disk, insulating spacing rings arranged one between each adjacent pair of disks for determining the width of each gap unit, and clamping means comprising a base plate, a top plate, a plurality of insulated rods carrying said electrodes and passing through said coolers, attached to said plates, and a screw movable in said top plate for clamping said disks and rings together and against the bottom plate, as set forth.

24. In an arrangement for producing slightly damped electrical oscillations by the shock excitation method, a series of quench spark gaps, comprising a plurality of parallel disks of a metal having a coefficient of conduction of heat at least equal to that of gold, forming the electrodes of spark gap units of which the series gap is composed, insulating spacing rings arranged one between each adjacent pair of disks for determining the width of each gap unit, clamping means for holding said disks and said rings together, and means temporarily attachable to the series spark gap for temporarily short-circuiting a gap unit in the same.

25. In an arrangement for producing slightly damped electrical oscillations by the shock excitation method, a short, quenched spark gap comprising a plurality of parallel plates forming the electrodes of the gap, the active faces of said plates being composed of a metal having a coefficient of conduction of heat at least equal to that of gold, a spacing insulator consisting of mica arranged between said plates for determining the width of the gap between the same, and clamping means for holding said plates and insulator together.

26. In an arrangement for producing slightly damped electrical oscillations by the shock excitation method, a short, quenched spark gap comprising a plurality of parallel plates forming the electrodes of the gap, the active faces of said plates being composed of a metal having a coefficient of heat conductivity at least equal to that of gold, a spacing insulator consisting of mica of uniform thickness arranged between said plates for determining the width of the gap between the same, and clamping means for firmly holding said plates and insulator together under pressure, whereby an air-tight spark chamber is obtained.

27. In an arrangement for producing slightly damped electrical oscillations by the shock excitation method, a short quenched spark gap having a plurality of electrodes whose faces are suitably shaped to form oppositely disposed parallel annular sparking areas, the distance between said areas representing the shortest distance between said electrodes throughout.

28. In an arrangement for producing slightly damped electrical oscillations by the shock excitation method, a short quenched spark gap comprising a plurality of electrodes having their active faces parallel to each other, a spacing insulator arranged between said electrodes for determining the width of the gap between said faces, the distance between said electrodes at the edges of the insulator being greater than the width of the gap which it determines.

29. In an arrangement for producing slightly damped electrical oscillations by the shock excitation method, a short quenched spark gap comprising a plurality of parallel plates forming the electrodes of said gap, the shape of the active faces of said plates being such that the sparking spaces between the same is annular.

30. In an arrangement for producing slightly damped electrical oscillations by the shock excitation method, a short, quenched spark gap having parallel electrode faces, each face having a central and a peripheral recess registering with the corresponding recesses of the face of the co-acting electrode.

31. In an apparatus for producing powerful electrical oscillations, a plurality of electrodes arranged in series and spaced apart from each other to form gaps therebetween, and means located out of contact with the arcing surfaces of the electrodes for maintaining the gaps between adjacent electrodes air-tight.

32. In an apparatus for producing powerful electrical oscillations, a plurality of metal electrodes spaced apart from each other to form spark gaps therebetween, and means interposed between adjacent electrodes but located out of contact with the arcing surfaces thereof for rendering the air gap spaces air-tight.

33. In an apparatus for producing powerful electrical oscillations, a plurality of metal electrodes of extended surface area, placed the one upon another, and means interposed between adjacent electrodes but located out of contact with the arcing surfaces thereof for rendering the spark gap space therebetween air-tight.

34. In an apparatus for producing powerful electrical oscillations, a plurality of disks or plates, superimposed one upon another, and means interposed between the peripheral edges of adjacent disks or plates and out of contact with the arcing surfaces thereof to determine an air gap and render the air gap space therebetween air-tight.

In testimony whereof, we affix our signatures in the presence of two witnesses.

GEORG GRAF ARCO.
RAGNAR HÅKAN RENDAHL.

Witnesses:
WOLDEMAR HAUPT,
HENRY HASPER.